(12) United States Patent
Wormald

(10) Patent No.: US 8,521,155 B2
(45) Date of Patent: Aug. 27, 2013

(54) PRESENCE-BASED CALL SWITCHING

(75) Inventor: Christopher R. Wormald, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1317 days.

(21) Appl. No.: 11/962,785

(22) Filed: Dec. 21, 2007

(65) Prior Publication Data

US 2009/0163201 A1    Jun. 25, 2009

(51) Int. Cl.
*H04W 4/00*    (2009.01)

(52) U.S. Cl.
USPC .......................... 455/428; 370/352; 370/401

(58) Field of Classification Search
USPC ...... 370/328–338, 351–356; 455/422.1–445, 455/456.1–457
See application file for complete search history.

(56) References Cited

U.S. PATENT DOCUMENTS

| | | | |
|---|---|---|---|
| 6,567,667 B1 | 5/2003 | Gupta et al. | |
| 7,688,745 B1 * | 3/2010 | Hurtta et al. | 370/252 |
| 2004/0087307 A1 * | 5/2004 | Ibe et al. | 455/436 |
| 2004/0196821 A1 * | 10/2004 | Haddad et al. | 370/349 |
| 2005/0282543 A1 * | 12/2005 | Idnani et al. | 455/432.1 |
| 2006/0121916 A1 * | 6/2006 | Aborn et al. | 455/456.5 |
| 2006/0133356 A1 * | 6/2006 | Suzukawa | 370/352 |
| 2006/0209794 A1 * | 9/2006 | Bae et al. | 370/352 |
| 2006/0229093 A1 * | 10/2006 | Bhutiani et al. | 455/518 |
| 2006/0270404 A1 * | 11/2006 | Tuohino et al. | 455/432.3 |
| 2007/0015536 A1 * | 1/2007 | LaBauve et al. | 455/552.1 |
| 2007/0036143 A1 | 2/2007 | Alt et al. | |
| 2007/0104184 A1 * | 5/2007 | Ku et al. | 370/352 |
| 2007/0171893 A1 * | 7/2007 | Xu et al. | 370/352 |
| 2007/0254681 A1 * | 11/2007 | Horvath et al. | 455/466 |
| 2007/0268858 A1 * | 11/2007 | Soto | 370/328 |
| 2007/0274289 A1 | 11/2007 | Buckley et al. | |
| 2007/0281704 A1 * | 12/2007 | Lin et al. | 455/445 |
| 2008/0070543 A1 * | 3/2008 | Matuszewski et al. | 455/404.1 |
| 2009/0258644 A1 * | 10/2009 | Osborn | 455/432.1 |
| 2010/0232368 A1 * | 9/2010 | Bogner et al. | 370/329 |

FOREIGN PATENT DOCUMENTS

| | | |
|---|---|---|
| EP | 1 725 064 A1 | 11/2006 |
| WO | WO 00/79814 A1 | 12/2000 |
| WO | WO 2006/010525 A1 | 2/2006 |
| WO | WO 2006/020975 A2 | 2/2006 |
| WO | WO 2006/127417 | 11/2006 |

* cited by examiner

*Primary Examiner* — Kashif Siddiqui

(57) ABSTRACT

To facilitate establishment of connections between dual-mode mobile wireless devices within a local wireless data network, at a network gateway for the local wireless data network, receiving from a first dual-mode mobile wireless device following entry of the first dual-mode mobile wireless device to the local wireless data network a registration request, a first dual-mode mobile wireless device telephone directory number (DN), and a first dual-mode mobile wireless device session initiation protocol (SIP) uniform resource identifier (URI). A first device dynamic data network address is assigned to the first dual-mode mobile wireless device. The first device DN and the first device SIP URI are forwarded to a database for storage no that the first device SIP URI is associated with the first device DN in the database. The first dual-mode mobile wireless device is returned a network SIP URI for the wireless data network.

13 Claims, 8 Drawing Sheets

PRESENCE-BASED CALL SWITCHING

FIELD OF TECHNOLOGY

The present disclosure relates to mobile telephony and, more particularly, to switching between placing a call using a first mode and placing a call using a second mode.

BACKGROUND

Telephony has, over the past century, become ubiquitous in developed countries around the world. What, for many years, was a communication technology that required physical, wired connections has evolved into a communication technology that includes many modes of communication, many of which include wireless connections. The cellular telephony industry was the first to offer mobile communication to customers who wished to be reachable by telephone while away from physical, wired connections.

Recent developments and standardization efforts have led to an increase in availability of wireless data networks. While the current wireless data networks do not offer the many-square-kilometer coverage areas that cellular base stations offer, the wireless access points that provide wireless data network services offer many-square-meter coverage areas. The coverage areas offered by wireless access points have been found to be suitable for users situated in cafés, airports and other public places.

In parallel with the developments in wireless networking, there have been advances in quality and acceptance of data network telephony, for instance, using the Internet. The Internet Engineering Task Force (IETF) has published a Request for Comments (RFC) numbered 3261 (see www.ietf.org) for a protocol called the "Session Initiation Protocol" or "SIP". SIP is an application-layer control protocol that can be used to establish, modify and terminate multimedia sessions (conferences) such as Internet telephony calls. Internet telephony applications are typically executed on desktop or laptop computers. However, as handheld computing devices, such as personal digital assistants (PDAs), have gained in processor power and added wireless networking capabilities, consequently, new applications have been developed to exploit their wireless networking capabilities and processing power. One such application is Internet telephony.

Many PDAs have cellular telephone capabilities. Where a device has cellular telephone capabilities (a first mode) and wireless data networking/Internet telephony capabilities (a second mode), the device may be called a dual-mode mobile terminal. Increasingly, a user of a dual-mode mobile terminal may find that both a cellular telephone network and a wireless data network are available at a given place and time. The user may consider that airtime used in placing a telephone call using the cellular telephone network may, for instance, be charged per minute. In contrast, often airtime in a wireless data network is provided freely, to encourage patronage close to the access point, say, where the access point has been established in a café or in an airport. At the given place and time, the user may wish to simply place a call, without having to configure the dual-mode mobile terminal to use one mode or another.

A method for performing presence-based call switching would be desirable.

DETAILED DESCRIPTION

Figure 1:
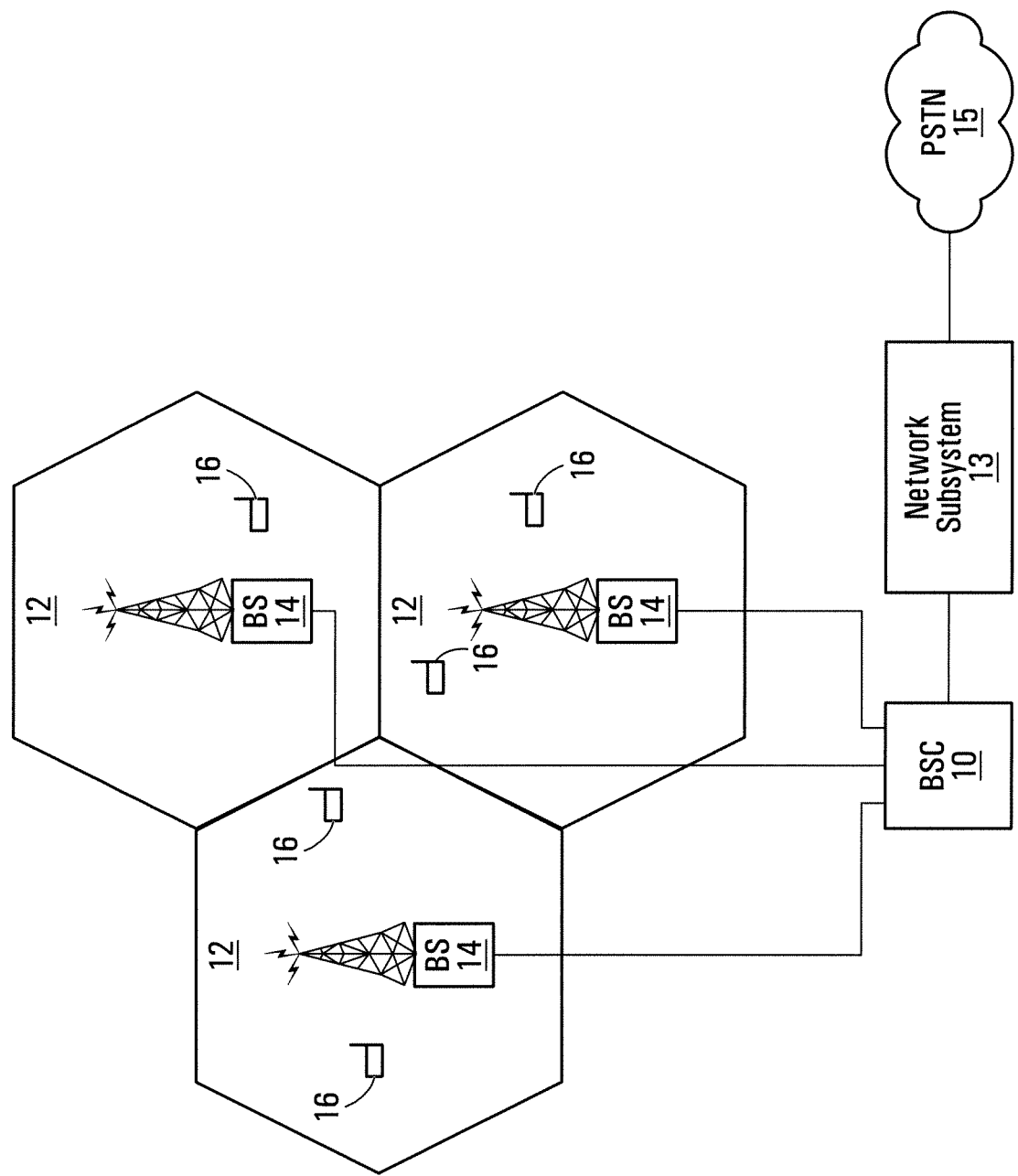
FIG. 1 is a schematic diagram illustrating components of a cellular telephony system.

In overview, setting up a call to a called party using a first communication mode, a dual-mode mobile terminal may determine whether the called party is available using a second communication mode. The determining may, for example, involve querying a database with a first-mode identity of the called party as a key, to obtain an associated second-mode identity. Alternatively, the second-mode identity may form part of presence information reported by the called party through a presence service in which the called party acts as a presentity. The second-mode identity may then be used to initiate the call. Advantageously, there may be a cost saving associated with placing the call using the second mode.

In accordance with an aspect of the present disclosure there is provided a method comprising: at a first wireless communication device capable of voice communication in a first mode and a second mode, establishing a connection to a second wireless communication device capable of communication in said first mode and said second mode by: receiving an indication of a first-mode identity of said second wireless communication device; transmitting a query to a database, where said query includes said first-mode identity for use as a key; receiving a response to said query; determining whether said response includes a second-mode identity for said second wireless communication device; and if said response includes said second-mode identity, initiating a second-mode call to said second-mode identity.

In accordance with another aspect of the present disclosure there is provided a method comprising: at a first wireless communication device capable of voice communication in a first mode and a second mode, establishing a connection to a second wireless communication device capable of communication in said first mode and said second mode by: receiving an indication of a first-mode identity of said second wireless communication device; receiving, via a presence service in which said second wireless communication device acts as a presentity, presence information regarding said second wireless communication device, said presence information including a second-mode identity of said second wireless communication device; based on said first-mode identity and said presence information, determining said second-mode identity of said first wireless communication device; and initiating a second-mode call to said second-mode identity.

In accordance with another aspect of the present disclosure there is provided a method of facilitating establishment of connection between a first wireless communication device, which is capable of communication in a first mode and a second mode, and a second wireless communication device, which is capable of communication in said first mode and said second mode, said method comprising: receiving, from said second wireless communication device, an initial second-mode connection request, said second-mode connection request including an indication of a first-mode identity for said second wireless communication device; transmitting a query to a database, where said query includes said first-mode identity as a key; receiving a response to said query; determining whether said response includes a second-mode identity for said second wireless communication device; if said response includes said second-mode identity, forming an amended second-mode connection request by amending said initial second-mode connection request to include said second-mode identity; and transmitting said amended second-mode connection request.

In accordance with another aspect of the present disclosure there is provided a machine readable medium storing software that, when executed by a processor of a first wireless communication device capable of voice communication in a first mode and a second mode, causes said device to establish a connection to a second wireless communication device capable of communication in said first mode and said second mode, by: receiving an indication of a first-mode identity of said second wireless communication device; transmitting a query to a database, where said query includes said first-mode identity for use as a key; receiving a response to said query; determining whether said response includes a second-mode identity for said second wireless communication device; and if said response includes said second-mode identity, initiating a second-mode call to said second-mode identity.

In accordance with another aspect of the present disclosure there is provided a machine readable medium storing software that, when executed by a processor of a first wireless communication device capable of voice communication in a first mode and a second mode, causes said device to establish a connection to a second wireless communication device capable of communication in said first mode and said second mode, by: receiving an indication of a first-mode identity of said second wireless communication device; receiving, via a presence service in which said second wireless communication device acts as a presentity, presence information regarding said second wireless communication device, said presence information including a second-mode identity of said second wireless communication device; based on said first-mode identity and said presence information, determining said second-mode identity of said first wireless communication device; and initiating a second-mode call to said second-mode identity.

In accordance with another aspect of the present disclosure there is provided a machine readable medium storing software that, when executed by a processor of a computing device, causes said computing device to facilitate establishment of connection between a first wireless communication device, which is capable of communication in a first mode and a second mode, and a second wireless communication device, which is capable of communication in said first mode and said second mode, by: receiving, from said second wireless communication device, an initial second-mode connection request, said second-mode connection request including an indication of a first-mode identity for said second wireless communication device; transmitting a query to a database, where said query includes said first-mode identity as a key; receiving a response to said query; determining whether said response includes a second-mode identity for said second wireless communication device; if said response includes said second-mode identity, forming an amended second-mode connection request by amending said initial second-mode connection request to include said second-mode identity; and transmitting said amended second-mode connection request.

Other aspects and features will become apparent to those of ordinary skill in the art upon review of the following description of specific embodiments in conjunction with the accompanying figures.

To provide context for the present disclosure, FIG. 1 shows a base station controller (BSC) 10 which controls wireless communications within multiple cells 12, which cells 12 are served by corresponding base stations 14. In general, each base station (BS) 14 facilitates communications with Mobile Subscriber Stations (MSS) 16, also called mobile and/or wireless terminals 16, which are within the cell 12 associated with the corresponding base station 14. The BSC 10 connects to a cellular telephone network subsystem 13 to facilitate routing of calls over a Public Switched Telephone Network (PSTN) 15.

Figure 2:
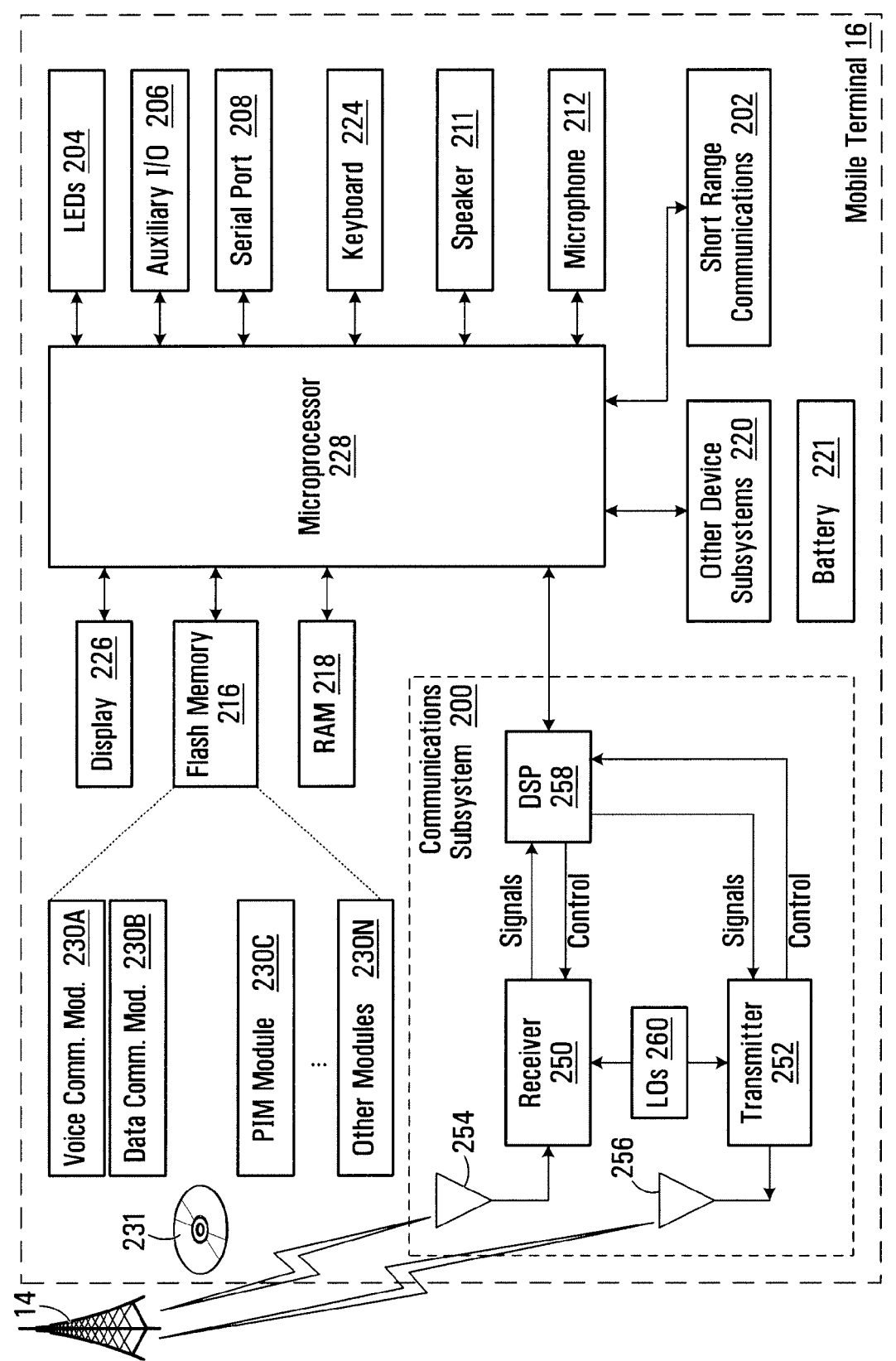
FIG. 2 is a schematic diagram illustrating an exemplary mobile terminal.

FIG. 2 illustrates an exemplary mobile terminal 16 (also possibly known as a "mobile device" or "wireless communication device") including a housing, an input device (a keyboard 224), and an output device (a display 226), which may be a full graphic Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile terminal 16, in response to actuation of keys on the keyboard 224 by a user.

The housing may be elongated vertically, or may take on other sizes and shapes (including clamshell housing structures). The keyboard may include a mode selection key, or other hardware or software for switching between text entry and telephony entry.

In addition to the microprocessor 228, other parts of the mobile terminal 16 are shown schematically in FIG. 2. These include: a communications subsystem 200; a short-range communications subsystem 202; the keyboard 224 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The mobile terminal 16 may have a battery 221 to power the active elements of the mobile terminal 16. The mobile terminal 16 may be a two-way radio frequency (RF) communication device having voice and data communication capabilities, such as a BlackBerry™ device from Research In Motion Limited (RIM). In addition, the mobile terminal 16 preferably has the capability to communicate with other computer systems via the Internet.

Operating system software executed by the microprocessor 228 may be stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile terminal 16. A predetermined set of software applications that control basic device operations, such as a voice communications module 230A and a data communications module 230B. In addition, a personal information manager (PIM) application module 230C may also be installed on the mobile terminal 16. The PIM application may be capable of organizing and managing data items, such as e-mail, calendar events, voice mails, appointments, and task items. The PIM application is also preferably capable of sending and receiving data items via a nearby base station 14. Preferably, the data items managed by the PIM application are seamlessly integrated, synchronized and updated via the base station 14 with the device user's corresponding data items stored or associated with a host computer system. As well, additional software modules, illustrated as an other software module 230N, may be installed during manufacture or subsequently. The various above-noted software applications may be installed on the mobile terminal 16 during manufacture (or afterwards) from a machine readable medium 231, such as an optical disk or magnetic medium for example.

Communication functions, including data and voice communications, are performed through the communication subsystem 200, and possibly through the short-range communications subsystem 202. The communication subsystem 200 includes a receiver 250, a transmitter 252 and one or more antennas, illustrated as a receive antenna 254 and a transmit antenna 256. In addition, the communication subsystem 200 also includes a processing module, such as a digital signal processor (DSP) 258, and local oscillators (LOs) 260. The specific design and implementation of the communication subsystem 200 is dependent upon the communication network in which the mobile terminal 16 is intended to operate. For example, the communication subsystem 200 of the mobile terminal 16 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile terminal 16.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile terminal 16 may send and receive communication signals over a wireless connection to the base station 14. Signals received from the base station 14 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals for transmission over the wireless connection to the base station 14 are processed (e.g., modulated and encoded) by the DSP 258 and are then provided to the transmitter 252 for digital to analog conversion, frequency up conversion, filtering, amplification and transmission over the wireless connection to the base station 14 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 200 and is input to the microprocessor 228. The received signal is then further processed by the microprocessor 228 for an output to the display 226, or alternatively to some other auxiliary I/O devices 206. A device user may also compose data items, such as e-mail messages, using the keyboard 224 and/or some other auxiliary I/O terminal 266, such as a touchpad, a rocker switch, a thumb-wheel, or some other type of input device. The composed data items may then be transmitted over the wireless connection to the base station 14 via the communication subsystem 200.

In a voice communication mode, overall operation of the device is substantially similar to the data communication mode, except that received signals are output to a speaker 211, and signals for transmission are generated by a microphone 212. Alternative voice or audio I/O subsystems, such as a voice message recording subsystem, may also be implemented on the terminal 16. In addition, the display 226 may also be utilized in voice communication mode, for example, to display the identity of a calling party, the duration of a voice call, or other voice call related information.

The short-range communications subsystem 202 enables communication between the mobile terminal 16 and other proximate systems or devices, which need not necessarily be similar devices. For example, the short-range communications subsystem may include an infrared device and associated circuits and components, or a Bluetooth™ communication module to provide for communication with similarly-enabled systems and devices.

Additionally, the short-range communications subsystem 202 may enable communication between the mobile terminal 16 and a wireless networking access point. The access point may, for instance, implement the known IEEE 802.11g wireless communication protocol. This protocol may be referred to as "WiFi", which is a term that may be applied to any type of 802.11 network (e.g. 802.11a, 802.11b, etc.). While a cellular telephone network base station 14 may define a cell 12 that covers an area of about a square mile, and often more, a wireless networking access point typically defines a hot spot that only covers about a quarter of a square mile.

Upon powering on, a given mobile terminal 16 conventionally transmits a registration request to a particular base station 14 (FIG. 1). The particular base station 14 forwards the registration request to the base station controller 10, which, in turn, transmits the registration request to the cellular telephone network subsystem 13. Advantageously, the registration request allows the directory number (DN) associated with the given mobile terminal 16 to be associated, in, for instance, a visitor location register, with the base station controller 10 and the particular base station 14. Additionally, the related cellular telephone network subsystem 13 may transmit an indication of the registration to a home location register (not shown) at a cellular telephone network subsystem related to a home location of the given mobile terminal 16.

For review and context purposes, an overview of the steps in completion of a call from a first mobile terminal in the cellular telephone network of FIG. 1 to a second mobile terminal in the cellular telephone network of FIG. 1 begins with the user of the first mobile terminal specifying a directory number for the second mobile terminal. This specification may be accomplished through use of the PIM application or simply through entering each digit in the directory number using the keyboard 224. Responsive to the specification of a directory number, the first mobile terminal (or, more specifically, the microprocessor 228 of the first mobile terminal) generates a call setup request that specifies the directory number of the second mobile terminal. The first mobile terminal then transmits the call setup request to a nearby base station 14, which forwards the call setup request to the base station controller 10.

The base station controller 10 forwards the call setup request to the cellular telephone network subsystem 13. The cellular telephone network subsystem 13 determines that the second mobile terminal 16 is associated with the base station controller 10. A mobile services switching center within the cellular telephone network subsystem then causes a paging call to be broadcast by the base stations 14 under the control of the base station controller 10 to inform the second mobile device 16 that a call is to be completed. The second mobile terminal 16 transmits a response to the paging call via a nearby base station 14 and the base station controller 10 to the mobile services switching center. The mobile services switching center may then set up a voice channel between the first mobile terminal and the second mobile terminal.

Now that a review of the registration of the first mobile terminal 16 in the cellular telephone network of FIG. 1 and of the setup of a call from the first mobile terminal to the second mobile terminal using the cellular telephone network of FIG. 1 is complete, attention may be turned to a review of the registration of the first mobile terminal 16 in a WiFi network.

Figure 3:
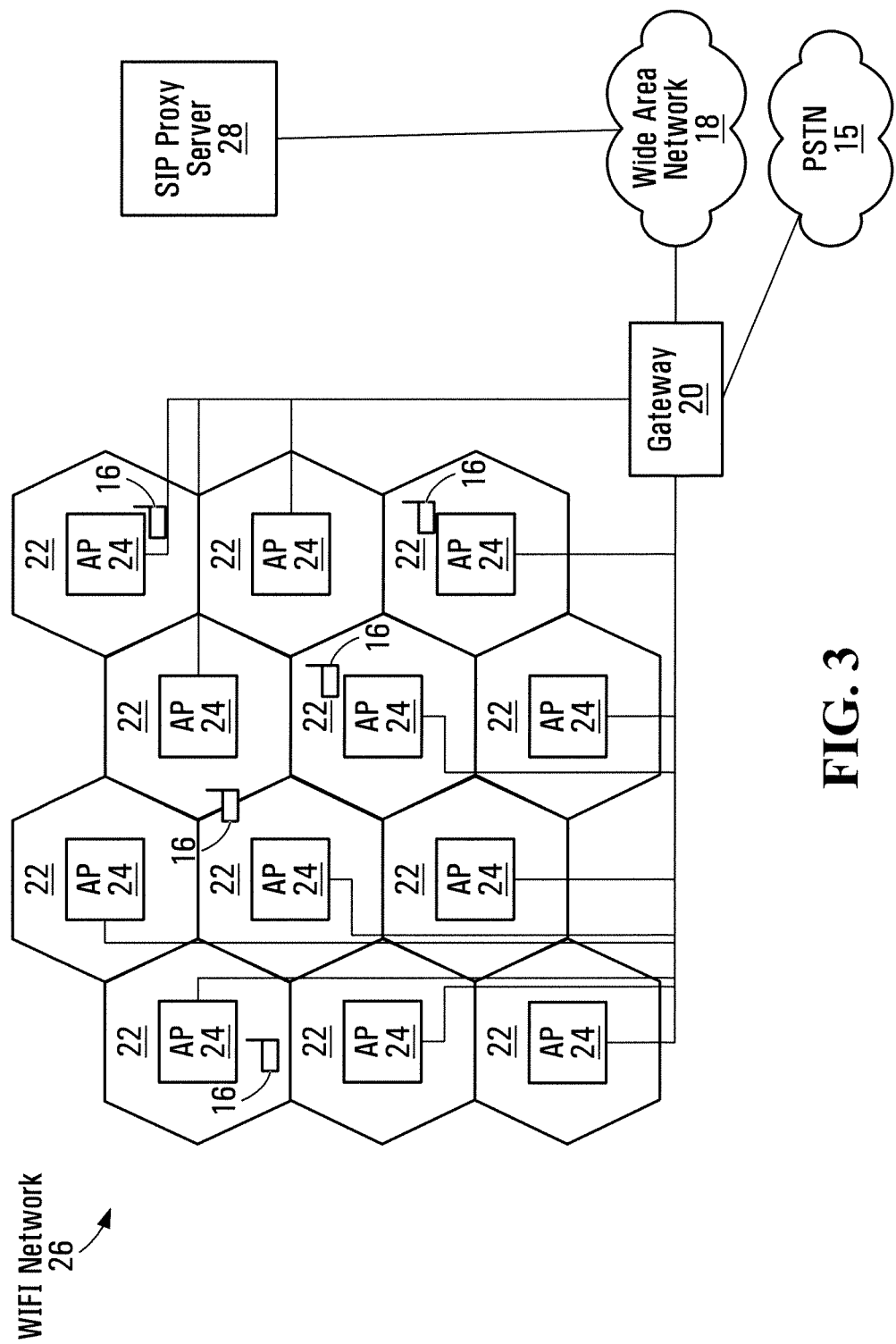
FIG. 3 is a schematic diagram illustrating a wireless data network.

FIG. 3 illustrates a network gateway 20 (a form of computing device) which aggregates communication to and from mobile terminals 16 within multiple hot spots 22, which hot spots 22 are defined by service provided by corresponding access points (AP) 24. In general, each access point 24 facilitates data network communications with the mobile terminals 16 that are within the hot spot 22 associated with the corresponding access point 24. The gateway 20 may coordinate assignment of dynamic data network addresses to the mobile terminals 16 and communication between the mobile terminals 16 and data sinks and sources in communication with a wide area network 18, which may be the Internet or a successor network. The gateway 20 also maintains a connection to the PSTN 15 to facilitate data network calls from the mobile terminals 16 to phones connected to the PSTN 15 in a manner that is discussed below. To facilitate use of a mobile terminal 16 to place a SIP telephone call, the provider of the WiFi network 26 of FIG. 3 may also provide a SIP proxy server 28.

In order to become registered with WiFi network 26 of FIG. 3, when the first mobile terminal 16 detects a signal from a nearby access point 24 (FIG. 3), it transmits a registration request to the access point 24.

Responsive to receiving the registration request, the access point 24 assigns a dynamic data network address, for instance, an Internet Protocol (IP) address comprising four period separated integers between 0 and 255 ("octets"), to the first mobile terminal and transmits an indication of the assigned address to the first mobile terminal. The first mobile terminal 16 may then identify itself by the assigned address when outgoing data network traffic requires such an identity.

Conventionally, when the first mobile terminal is to place a data network call to the second mobile terminal, the first mobile terminal is expected to be aware of an identity of the second mobile terminal or, at least, an identity of a user of the second mobile terminal. The Session Initiation Protocol, which is described in RFC 3261 (presently posted at www.ietf.org/rfc/rfc3261.txt, which posting is incorporated by reference hereinto), may be used to establish a data network call (e.g. a Voice-Over IP call)

An example of a conventional SIP message exchange between two users, Alice and Bob, is provided below, based on an example provided in RFC 3261. In the example, Alice uses a SIP application on her PC (referred to as a softphone) to call Bob on his SIP phone over the Internet. Involved in the message exchange are two SIP proxy servers that act on behalf of Alice and Bob to facilitate the session establishment.

Alice "calls" Bob using his SIP identity, a type of Uniform Resource Identifier (URI) called a SIP URI. A SIP URI is a form of data networking address that has a similar form to an email address, typically containing a username and a host name. In this case, the SIP URI for Bob is sip:bob@biloxi.com, where biloxi.com is the domain of Bob's SIP service provider. Alice has a SIP URI of sip:alice@atlanta.com. Alice might have typed in Bob's URI or perhaps clicked on a hyperlink or an entry in an address book.

SIP is based on a request/response transaction model. Each transaction consists of a request that invokes a particular method, or function, on the server and at least one response. In this example, the transaction begins with Alice's softphone sending an INVITE request addressed to Bob's SIP URI. INVITE is an example of a SIP method that specifies the action that the requestor (Alice) wants the server (Bob) to take. The INVITE request contains a number of header fields. Header fields are named attributes that provide additional information about a message. The ones present in an INVITE include a unique identifier for the call, the destination address, Alice's address, and information about the type of session that Alice wishes to establish with Bob.

Since Alice's softphone does not know the location of Bob or the SIP server in the biloxi.com domain, Alice's softphone sends the INVITE request to the SIP server that serves Alice's domain, atlanta.com. The address of the atlanta.com SIP server could have been configured in Alice's softphone, or it could have been discovered, for example, by the Dynamic Host Configuration Protocol (DHCP), which is described in RFC 2132. The latter RFC is presently posted at www.ietf.org/rfc/rfc2131.txt, and is incorporated by reference hereinto.

The atlanta.com SIP server is a type of SIP server known as a proxy server. A proxy server receives SIP requests and forwards them on behalf of the requester. In this example, the proxy server receives the INVITE request and sends a response back to Alice's softphone. The response indicates that the INVITE has been received and that the proxy server is working on her behalf to route the INVITE to the destination. The atlanta.com proxy server locates the proxy server at biloxi.com, possibly by performing a particular type of Domain Name Service (DNS) lookup to find the SIP server that serves the biloxi.com domain. As a result, the atlanta.com proxy server obtains the IP address of the biloxi.com proxy server and forwards, or proxies, the INVITE request there. Before forwarding the request, the atlanta.com proxy server adds an additional Via header field value that contains its own address (the INVITE already contains Alice's address in the first Via). The biloxi.com proxy server receives the INVITE request and responds with a response back to the atlanta.com proxy server to indicate that the biloxi.com proxy server has received the INVITE request and is processing the request. The biloxi.com proxy server consults a database, generically called a location service, that contains the current Internet Protocol (IP) address of Bob. As is known in the art, an IP address is a form of data network address. The biloxi.com proxy server adds another Via header field value with its own address to the INVITE request and transmits the INVITE request to Bob's SIP phone.

Bob's SIP phone receives the INVITE request and alerts Bob to the incoming call from Alice so that Bob can decide whether to answer the call, that is, Bob's SIP phone rings. Bob's SIP phone indicates this ringing in a response, which is routed back to Alice's softphone through the two proxies in the reverse direction. Each proxy server uses the Via header field to determine where to send the response and removes its own address from the top.

When Alice's softphone receives the response, Alice's softphone passes this information to Alice, perhaps using an audio ringback tone or by displaying a message on Alice's screen.

In this example, Bob decides to answer the call. When he picks up the handset, his SIP phone sends a further response to indicate that the call has been answered. The further response contains a message body with a Session Description Protocol ("SDP", see IETF RFC 2327 presently posted at www.ietf.org/rfc/rfc2327.txt, which is hereby incorporated by reference hereinto) media description of the type of session that Bob is willing to establish with Alice. As a result, there is a two-phase exchange of SDP messages: Alice sent one to Bob, and Bob sent one back to Alice. This two-phase exchange provides basic negotiation capabilities and is based on a simple offer/answer model of SDP exchange.

In this case, the further response is routed back through the two proxies and is received by Alice's softphone, which then stops the ringback tone and indicates that the call has been answered. Finally, Alice's softphone sends an acknowledgement message to Bob's SIP phone to confirm the reception of the further response. In this example, the acknowledgement message is sent directly from Alice's softphone to Bob's SIP phone, bypassing the two proxies. This occurs because the endpoints have learned each other's address from the Contact header fields through the exchange of the INVITE request and the response. Notably, the addresses were not known when the initial INVITE was sent, only the user name and host name. The lookups performed by the two proxies are no longer needed, so the proxies drop out of the call flow.

Alice and Bob's media session has now begun, and they send media packets using the format to which they agreed in the exchange of SDP. In general, the end-to-end media packets take a different path from the SIP signaling messages.

Since the number of potential recipients of SIP calls is presently limited, protocols have been established to allow a SIP phone to contact a conventional phone with a connection to the PSTN 15. For example, Integrated Services Digital Network (ISDN) User Part (ISUP) is a level 4 protocol used in Signaling System No. 7 (SS7) networks. ISUP typically runs over Message Transfer Part (MTP) although it can also run over IP. ISUP is used for controlling telephone calls and for maintenance of the network (blocking circuits, resetting circuits etc.). An ISUP message to SIP message mapping is provided in IETF RFC 3398 (presently posted at www.ietf.org/rfc/rfc3398.txt) which is incorporated by reference hereinto. Such a mapping may be employed by a PSTN gateway (e.g., the gateway 20 of FIG. 3).

To place a SIP call to a conventional phone (not shown) connected to the PSTN 15, the calling SIP phone is required to maintain a host name of the PSTN gateway 20 (e.g., gw.carrier.com). The calling SIP phone formulates an INVITE request with the directory number of the conventional phone as the user name in the SIP URI, e.g., sip:+12125551212@gw.carrier.com. The calling SIP phone then transmits the INVITE request to the PSTN gateway 20. At the PSTN gateway 20, the SIP signaling is translated into ISUP signaling. For instance, the PSTN gateway 20 translates the SIP INVITE request into an ISUP Initial Address Message (IAM). The PSTN gateway 20 then transmits the ISUP IAM, specifying the directory number +12125551212, over the PSTN 15 to an ISUP telephone switch (not shown). The ISUP telephone switch then arranges for the application of a ringing voltage on the line of the conventional phone.

In the event that a user answers the conventional phone, the ISUP telephone switch transmits an ISUP Answer Message to the PSTN gateway 20. The PSTN gateway 20 then transmits a SIP response message to the SIP phone. The SIP phone then transmits an acknowledgment message back to the PSTN gateway 20, thereby completing the setup of a media session with the PSTN gateway 20. The PSTN gateway 20 also acts as one terminal for the PSTN connection with the conventional phone over the PSTN via the ISUP telephone switch, so that the user of the SIP phone and the user of the conventional phone may communicate as expected.

Recently, manufacturers have begun to offer dual-mode mobile terminals, that is, mobile terminals with the capability to work as a cellular phone, a SIP phone for Voice over IP (VoIP), or both simultaneously. For instance, model number N900iL by manufacturer NEC can operate as a mobile phone under a Wideband Code Division Multiple Access (W-CDMA) cellular telephone network, or as a VoIP phone with SIP control under a wireless IEEE 802.11b (WiFi) network. Alternatively, the N900iL can be set up for dual-mode operation under both kinds of networks simultaneously.

To be configured to use the SIP proxy server 28 of FIG. 3, each mobile terminal 16 registers with the SIP proxy server. Thereafter, a registered mobile terminal 16 may initiate a SIP call, in the manner described above, in part by specifying an identity of a call recipient by SIP URI.

When the users of two dual-mode mobile terminals 16 are in an area that is serviced both by a cellular telephone network (FIG. 1) and a WiFi network 26 (FIG. 3), which may be a public network in, for instance, an airport or a theme park, the two users may wish to communicate economically. In this case, a data network call, such as a SIP-initiated voice over IP call, is likely to be considered preferable to a cellular telephone call due to its likely lower cost. However, because IP addresses are typically dynamically assigned to each mobile terminal 16 upon entry into the coverage area, each of the mobile terminals 16 may be unaware of the recently-assigned IP address of the other. Moreover, even if each mobile terminal 16 is aware of the SIP URI of the other (e.g. as when the SIP URI of the other user has been programmed into an address book of a PIM application), this alone may be insufficient for initiating a SIP call. The reason is that a default SIP proxy server associated with the mobile terminals 16, through which call setup conventionally occurs, may be in home domain of the users. This home domain likely constitutes a network that is separate from the WiFi network 26. The default SIP proxy server may thus be unable to establish a conventional SIP connection between the two mobile terminals, since the temporarily assigned IP addresses of the mobile terminals are specific to the WiFi network that is outside the domain of the SIP proxy server. Accordingly, the two users may be forced to place calls over the cellular telephone network, which may be expensive.

In overview, a user initiates a call using a first-mode identity (e.g., a directory number) according to a first-mode method of placing a call from a mobile terminal 16. To facilitate a switch of the call from the first mode to a second mode (e.g., a data network call such as a voice-over-IP call), the mobile terminal 16 or the gateway 20 may determine that the first-mode identity corresponds to a second-mode identity (e.g., an IP address or a SIP URI). The mobile terminal 16 or gateway 20 may then establish a second-mode call with or without the knowledge of the user of the mobile terminal 16. Advantageously, the second-mode call provides benefits over the first-mode call, such as reduced cost.

Figure 4:
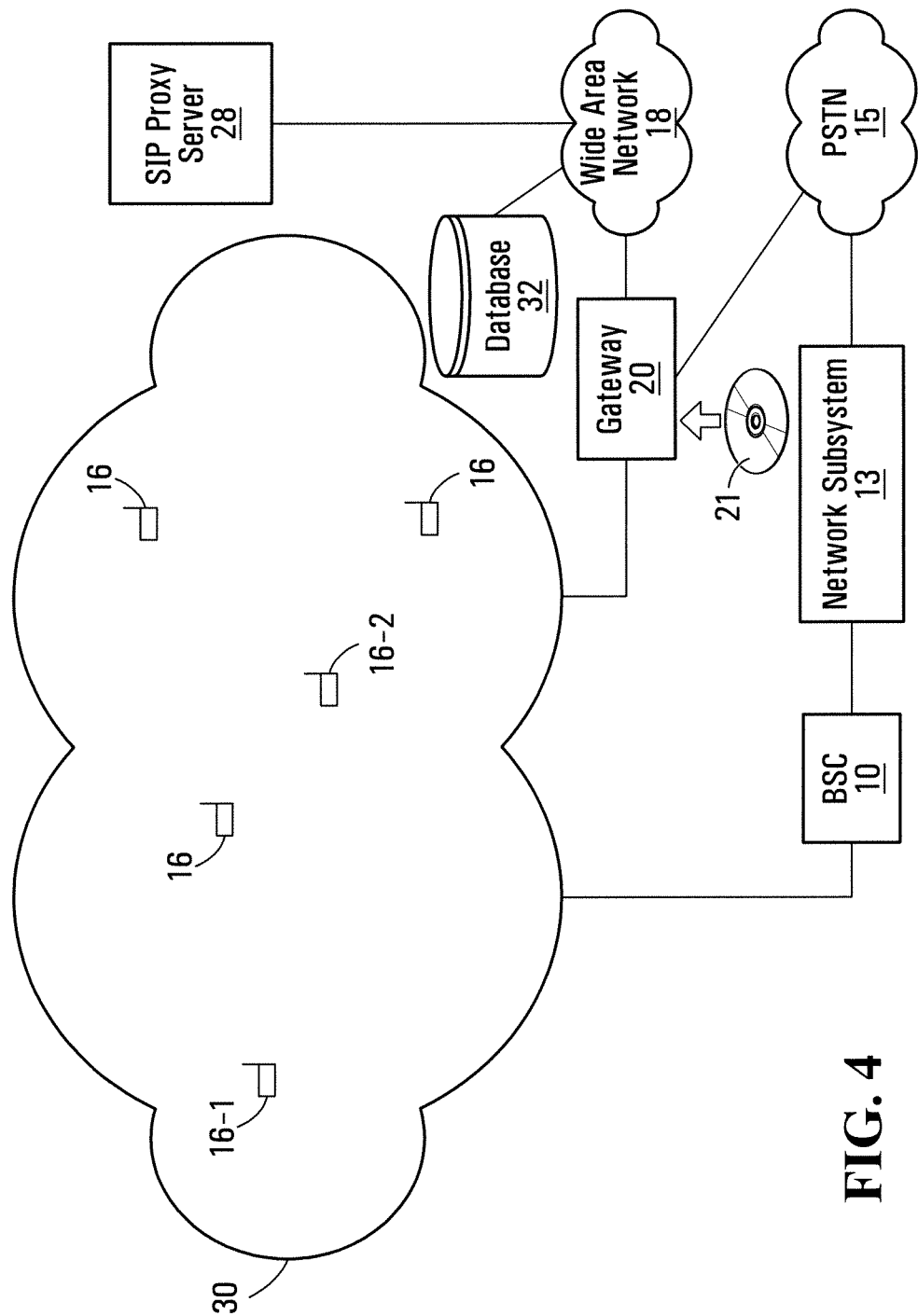
FIG. 4 is a schematic diagram illustrating a system with a dual-mode zone in which a mobile terminal may place a call in either of a first mode or a second mode.

A first embodiment may be considered in view of FIG. 4. A dual-mode zone 30 is illustrated and may be defined as an area in which the mobile terminals 16 are provided with both first-mode (e.g., cellular telephone) service and second-mode (e.g., WiFi) service. Accordingly, the dual-mode zone 30 is associated with the base station controller 10 familiar from FIG. 1 and the gateway 20 familiar from FIG. 3. Operation of gateway 20 as described herein may however deviate somewhat from the operation of conventional gateways, and may be governed by software loaded from a machine readable medium 21, such as an optical disk or magnetic medium for example. The base stations 14 and the access points 24 to which the base station controller 10 and gateway 20 connect, respectively, are not shown in FIG. 4 for clarity of illustration. FIG. 4 also illustrates new network elements in the form of a database 32 in communication with a local area network (LAN) 418 accessible by gateway 20. As is typical, the database 32 may be considered to maintain a plurality of records in one or more tables.

In operation, a first dual-mode mobile terminal 16-1 with directory number (DN) A initially registers with the WiFi network 26 (e.g. upon power-up) and, in so doing, is assigned an IP address A, as is conventional. Thereafter, the mobile terminal 16-1 communicates its DN to gateway 20, either automatically or at the request of gateway 20. The gateway 20 in turn creates a new entry 31-1 within database 32 to store DN A and IP address A of the first dual-mode mobile terminal 16-1, such that DN A and IP address A are associated with each other. Through a like sequence of steps (that may simply occur upon power-up of the mobile terminal 16-2), a separate entry 31-2 associating DN B and IP address B of the second mobile terminal 16-2 is also created in the database 32.

At a later time, the user of the second dual-mode mobile terminal 16-2 interacts with a user interface of a phone client executed on the second dual-mode mobile terminal 16-2 to enter the directory number A of the first dual-mode mobile terminal 16-1. The user of the second dual-mode mobile terminal 16-2 then selects "send" to initiate a call to the first dual-mode mobile terminal 16-1, which is associated with DN A.

Figure 5:
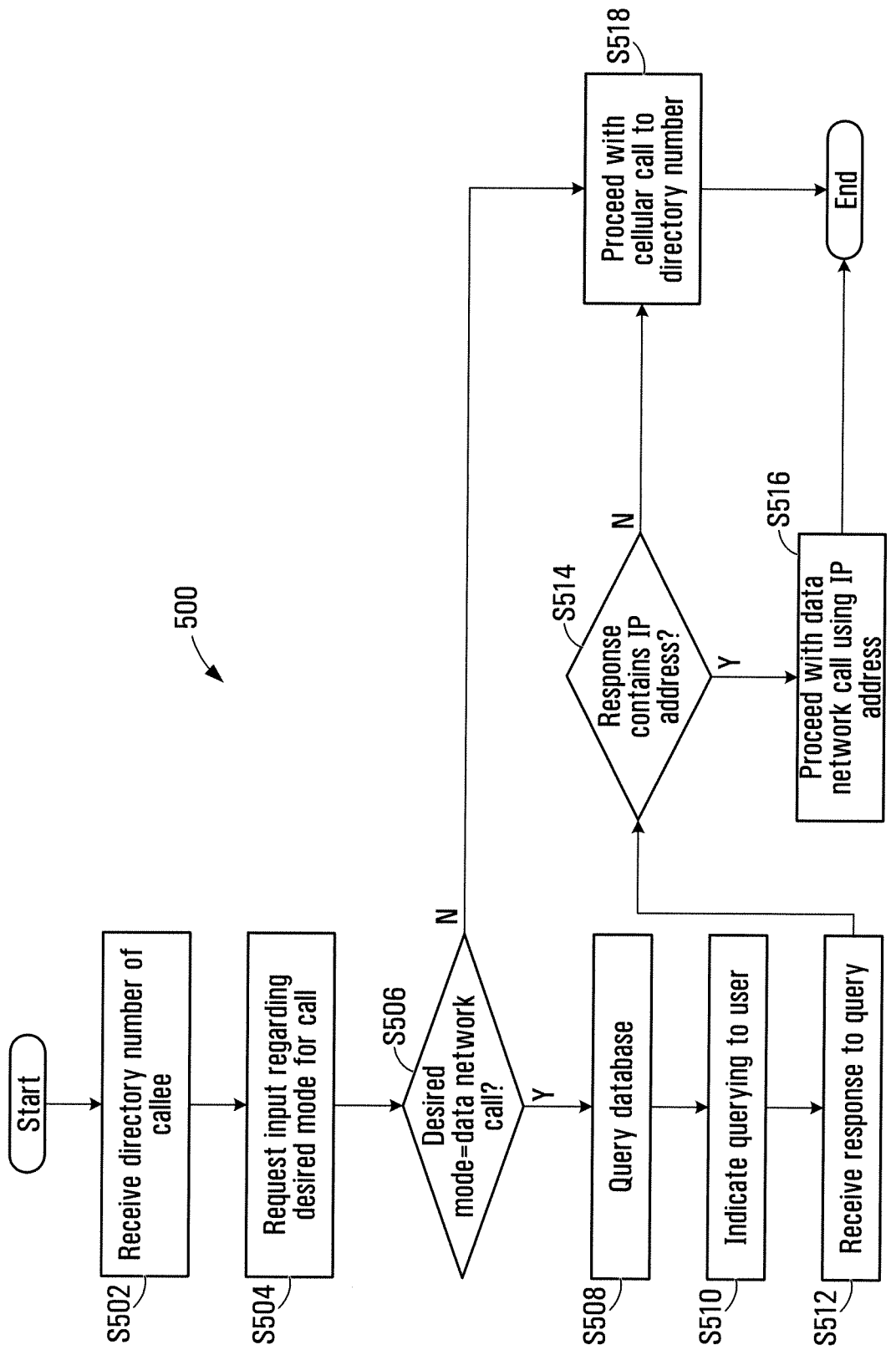
FIG. 5 illustrates operation of a mobile terminal component of FIG. 4 for placing a call using either of a first mode or a second mode.

FIG. 5 illustrates exemplary operation 500 for handling the directory number input by the user, as performed by the phone client on the second dual-mode mobile terminal 16-2. As a result of the user selecting "send", the phone client receives the directory number A associated with mobile terminal 16-1 of the party to be called (S502). The phone client may then present a dialog box (S504) on the display of the dual-mode mobile terminal 16-2 providing a number of options associated with call modes which would potentially be available. The options may, for instance, include: attempting to complete a cellular telephone call to the mobile terminal associated with the directory number; and attempting to complete a data network call (e.g. a VoIP call) to the mobile terminal associated with the directory number. If the phone client determines (S506) that the user has selected the data network call option, the phone client transmits a query (S508), via an access point, gateway 20 and local area network 418, to the database 32 with the directory number A as a key (FIG. 4). The purpose of the transmission is to establish whether the mobile terminal 16-1 that is associated with the dialed directory number also has an associated IP address on the local WiFi network.

While waiting for a response to the query, the phone client may indicate (S510), say, in a dialog box on the display of the second dual-mode mobile terminal 16-2, that the phone is searching for the called party on a local network, or that the device is attempting to place a "free call" using a local network (assuming there is no charge for data network calls). Display of such a dialog box is not required, however, and may be omitted in some embodiments.

If the directory number is present in one of the records in the table in the database 32, the database 32 transmits a query response back to the second dual-mode mobile terminal 16-2. The query response includes an indication of the IP address A associated with the directory number A of mobile terminal 16-1 as retrieved from entry 31-1 of database 32.

Upon receiving (S512) the query response from the database 32, the phone client determines (S514) whether an IP address was provided in the query response. Where the phone client determines that a IP address has in fact been provided in the query response as in the present example, the phone client proceeds with initiating a data network call (S516) to mobile terminal 16-1 using the IP address A. Methods for initiating a data network call using an IP address are well known in the art.

If the directory number of mobile terminal 16-1 is not present in the table of database 32, the database 32 transmits a query response back to the gateway 20. The query response includes a null entry in a field that would, otherwise, include an IP address.

Where the phone client determines (S514) that no IP address has been provided in the response, the phone client proceeds with a cellular telephone call (S518) to the directory number. That is, the phone client transmits a call setup request to a nearby base station 14, where the call setup request indicates the directory number A of the first dual-mode mobile terminal 16-1.

Additionally, where the phone client determines (S506) that the user has declined to have the data network call option explored, the phone client may proceed with a cellular telephone call (S518) to directory number A. That is, the phone client transmits a call setup request to a nearby base station 14, where the call setup request indicates the directory number of the first dual-mode mobile terminal 16-1.

In some embodiments, data network calls between mobile terminals 16-1 and 16-2 of FIG. 4 may be achieved using SIP. Such embodiments may differ in several respects from the above-described embodiments in which only the IP address was used to establish data network calls.

First, upon initial registration of mobile terminals 16-1 and 16-2 with the WiFi network 26 (e.g. upon power-up), when IP addresses A and B are conventionally assigned to terminals 16-1 and 16-2, gateway 20 may apprise mobile terminal 16-1 of the identity of the SIP proxy server 28 for that network 26. Using this information, each of mobile terminals 16-1 and 16-2 may automatically transmit a registration request to the SIP proxy server 28, via an access point, gateway 20 and LAN 618. The registration requests apprises SIP proxy server 28 (or, more particularly, a conventional SIP registrar (not expressly illustrated) associated with the SIP proxy server 28) of the current IP addresses of mobile terminals 16-1 and 16-2, for use in routing incoming calls to those devices. Included with each registration request is the SIP URI of the requesting mobile terminal. This SIP URI may be predetermined, e.g. assigned to the mobile terminal by a service provider in a home domain, or may be dynamically assigned by the gateway 20 upon power-up of mobile terminals 16-1 and 16-2, in conjunction with conventional registration.

Second, when mobile terminal 16-1 communicates its DN to gateway 20 with a view to creating database entry 31-1, it communicates its SIP URI rather than its IP address A, such that when gateway 20 creates a new entry 31-1 within database 32, it associates DN A with the SIP URI of mobile terminal 16-1 rather than with IP address A of that terminal. The same is true for mobile terminal 16-2 (i.e. entry 31-2 associates DN B with the SIP URI of mobile terminal 16-2 rather than with IP address B of that mobile terminal 16-2).

Third, the determination of S514 is made in the positive when the query response includes a SIP URI, rather than an IP address.

Fourth, when a data network call is placed in S516, it is done using the returned SIP URI of the called party, not the IP address of the called party. For example, the phone client would initially transmit an INVITE request indicating the SIP URI of mobile terminal 16-1 to the SIP proxy server 28. Thereafter, a media session (e.g. a VoIP call) can be established using SIP, as described above. This is possible because the mobile terminal 16-1 has registered with SIP proxy server 28, which, unlike a home SIP proxy server within a home domain of the called party, is within the same domain as the temporarily assigned IP address A of mobile terminal 16-1.

Figure 6:
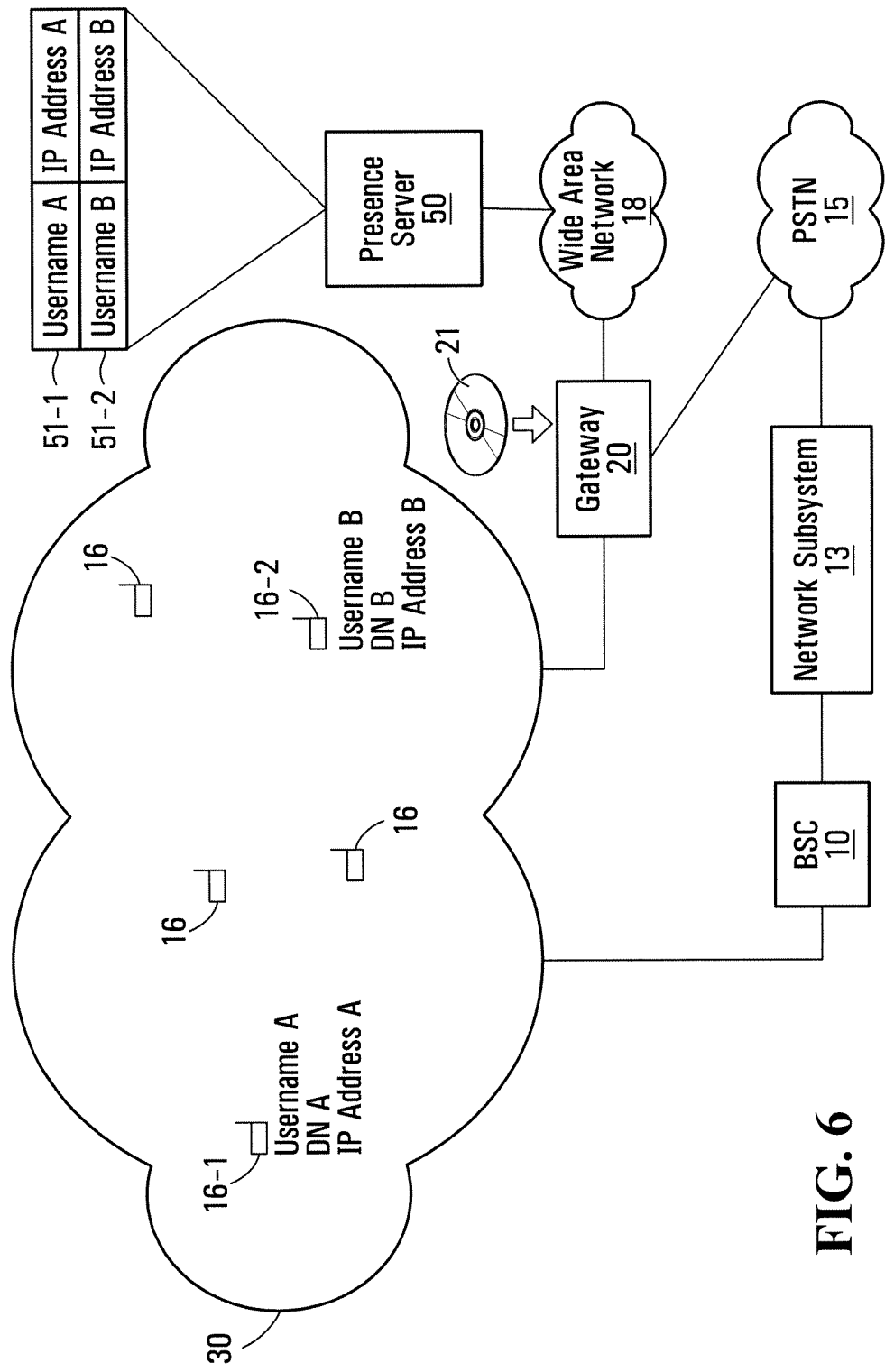
FIG. 6 is a schematic diagram illustrating another system with a dual-mode zone in which a mobile terminal may place a call in either of a first mode or a second mode.

An embodiment which uses a conventional presence service to determine the dynamically assigned IP address of a party to be called is illustrated in FIG. 6. Presence services are likely best known in the context of conventional instant messaging (IM) services, such as .NET Messenger Service, AOL® Instant Messenger™ (AIM), Excite® Pal, Gadu-Gadu, Google Talk™, iChat®, ICQ®, Jabber®, Qnext™, QQ®, Skype® and Yahoo!® Messenger, where they allow IM subscribers to learn whether other users of interest are currently on-line and available for exchanging instant messages.

As is known in the art, a presence service has two distinct sets of "clients". One set of clients, called presentities, provides presence information to be stored and distributed. The other set of clients, called watchers, receives presence information from the service. For example, in an IM system, each user's client software application may act as both a presentity and a watcher. The presentity publishes presence information about that user (e.g. "I am online and available for messaging", "client idle", "do not disturb", etc.), while the watcher receives presence information regarding users in a user-specified set of contacts (commonly known as a "contact list", "buddy list" or "friend list"). Thus, when a presentity detects a change in the presence information of the user, the presentity may automatically report the changed availability to other users. This is typically done via a central server, which in the case of an instant messaging system may be a central IM server. Specifically, the report regarding changed status may be sent to the central IM server, which in turn reports the changed availability of that presentity by way of presence updates that are sent to all connected IM users who have elected to receive such updates regarding that contact (i.e. watchers). This operation is conventional. However, in the present description the use of the presence service in an unconventional manner, i.e. to communicate second-mode identities of dual-mode wireless communication devices, will be described.

It is noted that presence services and instant messaging are described in further detail in "RFC 2778—A Model for Presence and Instant Messaging", which is available at www.ietf.org/rfc2778.txt and is incorporated by reference hereinto. The information within this reference is known to those of ordinary skill in the art.

Referring to FIG. 6, it will be observed that the illustrated embodiment is different in several respects from the embodiment of FIG. 4. First, a presence service 50 takes the place of database 32 as the mechanism by which second-mode identities of prospective called parties are learned. It is assumed that both of mobile terminal 16-1 and mobile terminal 16-2 subscribe to the same presence service 50 (e.g. as part of a wireless IM service subscription). Accordingly, the users are assumed to have identities within the presence service (usernames A and B), which are known to each other and each has given the other permission to view updates of the other's presence information. In the description of operation which follows, mobile terminal 16-1 acts as a presentity while mobile terminal 16-2 acts as a watcher of that presentity within presence service 50. That is, whenever the presence information of mobile terminal 16-1 changes, the changed information is made known to mobile terminal 16-2. Notably, the presence information in this embodiment has been extended to include a second-mode identity of the mobile terminal 16-2 (e.g. its dynamically assigned IP address or SIP URI).

Second, the system includes a wide area network 18, such as the Internet, for connectivity between gateway 20 and the presence service 50, which may be in a geographically remote location.

Figure 7:
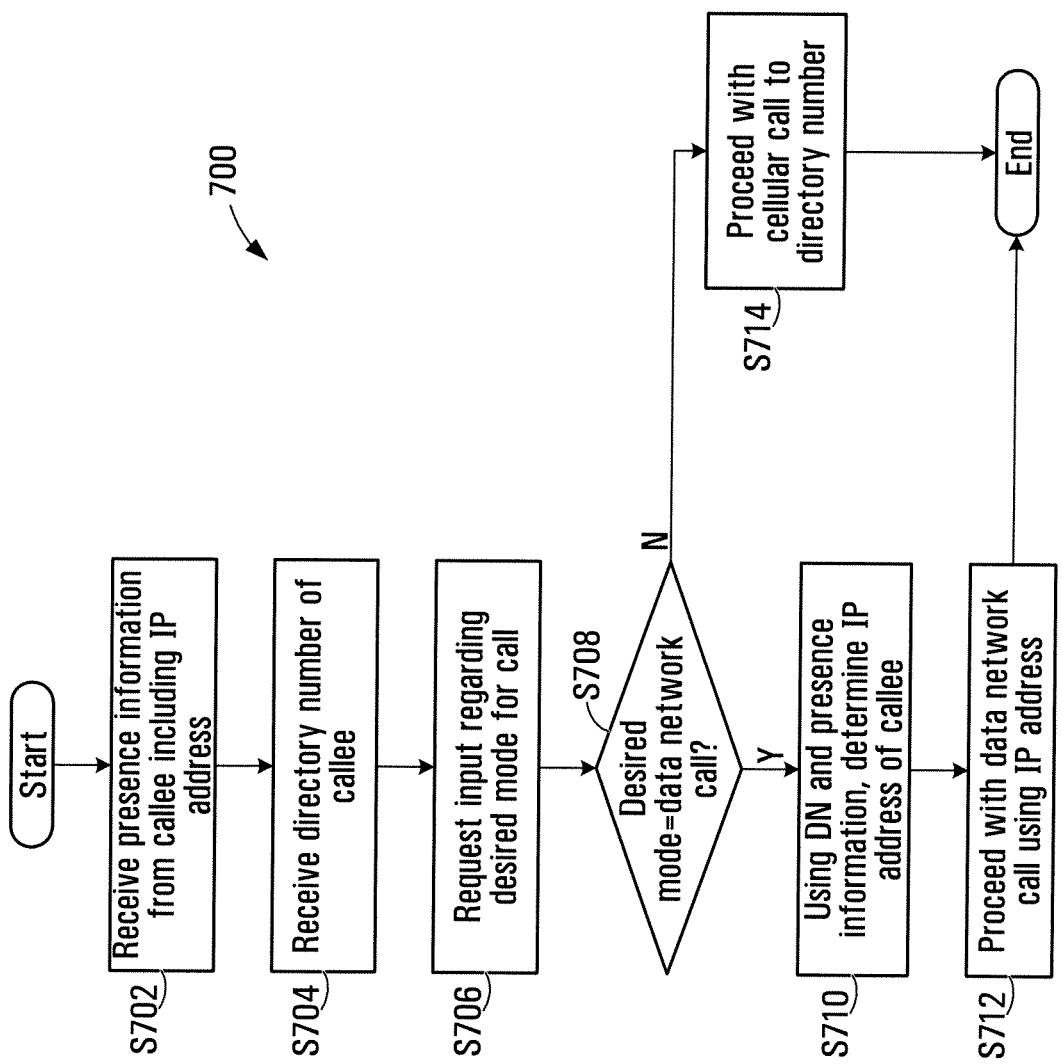
FIG. 7 illustrates operation of a mobile terminal component of FIG. 6 for placing a call using either of a first mode or a second mode.

FIG. 7 illustrates exemplary operation 700 for handling the directory number (first-mode identity) input by the user, as performed by the phone client on the second dual-mode mobile terminal 16-2 of the embodiment of FIG. 6. It is assumed that, upon initial registration of mobile terminal 16-1 with the WiFi network 26 (e.g. upon power-up), rather than storing the dynamically assigned IP addresses A of mobile terminal 16-1 in database 32 (which does not form part of this embodiment), the IP address A is instead stored as part of the presence information of the respective user (having username A) within presence service 50. That is, the dynamically assigned IP address A for mobile terminal 16-1 is stored as part of the presence information for that user within presence service 50, as represented in FIG. 6 by entry 51-1. (A similar procedure for mobile terminal 16-2 results in entry 51-2).

Initially, through operation of the presence service 50, mobile terminal 16-2 receives, via presence service 50, presence information regarding mobile terminal 16-1, which presence information includes the dynamically assigned IP address A (S702) of mobile terminal 16-1. This receiving may by triggered by mobile terminal 16-1 (the presentity) reporting its IP address (its second-mode identity) to mobile terminal 16-2 (the watcher) via presence service 50. The received information may take the form of a presence update received wirelessly at mobile terminal 16-2. To entitle mobile terminal 16-2 (the watcher) to receive this information, appropriate permissions may need to have been set within presence service 50 by the presentity.

As a result of the user selecting "send", the phone client receives the entered directory number A associated with mobile terminal 16-1 (S704). The phone client may then present a dialog box (S706) on the display of the dual-mode mobile terminal 16-2 providing a number of options associated with call modes which would potentially be available. The options may, for instance, include: attempting to complete a cellular telephone call to the mobile terminal associated with the directory number; and attempting to complete a data network call (e.g. a VoIP call) to the mobile terminal associated with the directory number.

If the phone client determines (S708) that the user has selected the data network call option, the phone client uses the directory number A and the received presence update for mobile terminal 16-1 to determine the IP address of the callee (S710). Presence information and identity of individuals may for example be linked by the phone client via the address book.

The phone client then proceeds with a initiating a data network call (S712) to mobile terminal 16-1 using the IP address A.

Where the phone client determines (S708) that the user has declined to have the data network call option explored, the phone client may proceed with a cellular telephone call (S714) to directory number A. That is, the phone client transmits a call setup request to a nearby base station 14, where the call setup request indicates the directory number of the first dual-mode mobile terminal 16-1. Although not expressly illustrated in FIG. 7, the same might occur if the presence information of mobile terminal 16-1 is not found to contain an IP address at S710.

Like the embodiment of FIG. 4, the embodiment of FIG. 6 could similarly be configured to use SIP URI information to establish data network calls instead of IP addresses. In this case the presence information for each user would include the SIP URI assigned to the user through pre-configuration or dynamic assignment. Each mobile terminal 16-1 and 16-2 could be automatically apprised of the SIP URI of the other through presence updates, as described above.

Figure 8:
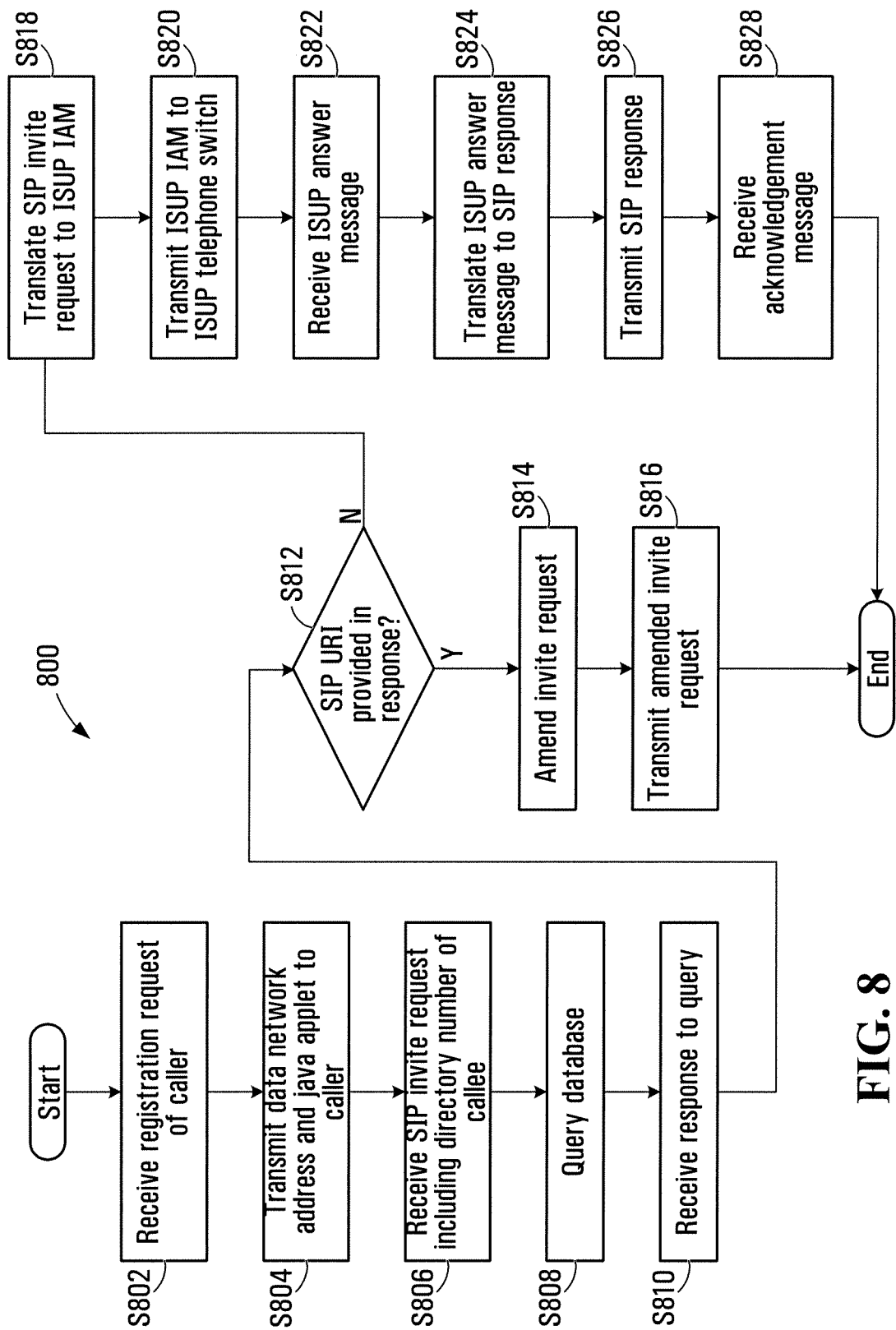
FIG. 8 illustrates operation of a gateway component for placing a call using either of a first mode or a second mode.

FIG. 8 illustrates operation 800 at the gateway 20 of another method of handling an outgoing call from a dual-mode mobile terminal 16-2. It is assumed that the dual-mode mobile terminal 16-1 has an assigned SIP URI, whether pre-configured or dynamically assigned. It is further assumed that mobile terminal 16-1 communicates its SIP URI, rather than its IP address A, to gateway 20 along with its DN, such that when gateway 20 creates new entry 31-1 within database 32, it associates DN A with the SIP URI of mobile terminal 16-1 rather than with IP address A of that terminal. As well, it is assumed that upon initial registration of mobile terminals 16-1 with the WiFi network 26 (e.g. upon power-up), gateway 20 apprises mobile terminal 16-1 of the identity of the SIP proxy server 28 for that network 26, and that mobile terminal 16-1 automatically transmits a registration request to the SIP proxy server 28 to apprise it of its current IP address. (Similar operation would also occur from mobile terminal 16-2).

It is further assumed that mobile terminal 16-2 subsequently transmits a registration request to the gateway 20 so that mobile terminal 16-2 may employ the WiFi network 26. Referring to FIG. 7, the gateway 20 receives (S802) the registration request. Along with a typical response to the registration request, the gateway 20 transmits (S804) instructions and configuration data that configures the second dual-mode mobile terminal 16-2 to initiate every call as a SIP call to the gateway 20. The configuration data may, for instance, include a SIP host name of the gateway 20. Such instructions data may, for instance, be transmitted in the form of a Java™ applet that instructs the phone application on the device to override a cellular call and substitutes a new method of contacting the same person. Since the mobile terminal 16-2 did not specifically request the Java™ applet, it may be considered that the Java™ applet has been "pushed" to the mobile terminal 16-2. The mobile terminal 16-2 receives the registration response from the gateway 20 and configures itself appropriately. Where the microprocessor of the mobile terminal 16-2 executes a Java™ virtual machine, "configuring itself" may mean executing the Java™ applet provided by the gateway 20. At a later time, the user of the mobile terminal 16-2 interacts with a user interface of the phone client executed on the mobile terminal 16-2 to enter the directory number A of the first dual-mode mobile terminal 16-1. The user of the mobile terminal 16-2 then selects "send" to initiate a call to the mobile terminal 16-1, which is associated with directory number A.

As a result of the user selecting "send", the phone client of mobile terminal 16-2 receives the directory number. The phone client then uses SIP to initiate a call to the directory number of mobile terminal 16-1 by formulating a SIP INVITE request with the SIP URI specified as a combination of the directory number and the host name of the gateway 20 (e.g., if the directory number of mobile terminal 16-1 is (123) 456-7890, the URI may be SIP: +11234567890@gw.carrier.com). This URI is referred to as the "generated URI" for convenience.

The gateway 20 receives (S806) the INVITE request and parses the INVITE request to determine the directory number. The gateway 20 then transmits a query (S808), via the wide area network 18, to the database 32 with the directory number as a key. The gateway 20 may be considered to be attempting to establish whether the mobile terminal 16 that is associated with the directory number is also associated with a SIP URI (which is distinct from the generated URI of the preceding paragraph).

If the directory number of the called mobile terminal 16-1 is present in one of the records in the table in the database 32, the database 32 transmits a query response back to the gateway 20. The query response includes an indication of the SIP URI associated with the directory number in the database 32.

The gateway 20 receives (S810) the response to the query and determines (S812) whether a SIP URI was provided in the response. Where the gateway 20 determines that a SIP URI has been provided in the response, the gateway 20 amends (S814) the INVITE request received from the mobile terminal 16-2 to replace the generated URI with the SIP URI provided by the SIP database. The gateway then transmits (S816) the amended INVITE request to the SIP proxy server 28. At the SIP proxy server 28, the amended INVITE request appears to have originated at the mobile terminal 16-2.

The SIP proxy server 28 forwards the INVITE request to the first dual-mode mobile terminal 16-1. The mobile terminal 16-1 then transmits a response to the INVITE request to the SIP proxy server 28. The SIP proxy server 28 transmits the response to the second dual-mode mobile terminal 16-2. Responsive to receiving the response, the mobile terminal 16-2 transmits an acknowledgement directly to the first dual-mode mobile terminal 16-1, thereby completing the establishment of a media session.

If the directory number of mobile terminal 16-1 is not present in one of the records in the table in the database 32, the database 32 transmits a query response back to the gateway 20. The query response includes a null entry in a field that would, otherwise, include a SIP URI.

Where the gateway 20 determines (S812) that a SIP URI has not been provided in the query response, the gateway 20 facilitates a SIP to PSTN call, as is described above, by translating SIP signaling into ISUP signaling. In particular, the gateway 20 translates (S818) the SIP INVITE request into an ISUP IAM and transmits (S820) the ISUP IAM to the appropriate ISUP telephone switch. The ISUP telephone switch then arranges, through the cellular telephone network subsystem 13, the base station controller 10 and a base station 14 (FIG. 4), for the application of a ringing voltage on the first dual-mode mobile terminal 16-1. In the event that the user answers the first dual-mode mobile terminal 16-1, the ISUP telephone switch receives an indication of the answering of the mobile terminal 16-1. Responsively, the ISUP transmits an ISUP Answer Message to the gateway 20. The gateway 20 then receives the ISUP Answer Message (S822), translates the ISUP Answer Message into a SIP response message (S824) and transmits (S626) the SIP response message to the second dual-mode mobile terminal 16-2. The second dual-mode mobile terminal 16-2 then transmits an acknowledgment message to the PSTN gateway 20.

Once the gateway 20 has received (S828) the acknowledgement message from mobile terminal 16-2, the setup of a media session between the second dual-mode mobile terminal 16-2 and the PSTN gateway 20 may be considered complete. The PSTN gateway 20 maintains the PSTN connection with the first dual-mode mobile terminal 16-1 over the PSTN via the ISUP telephone switch so that the user of the second dual-mode mobile terminal 16-2 and the user of the first dual-mode mobile terminal 16-1 may communicate as expected.

Notably, the activities outlined above may be accomplished "behind the scenes", that is, without the awareness of the user of the second dual-mode mobile terminal 16-2, who merely has entered a directory number and selected "send" in order to be connected to the user associated with the specified directory number.

The software described above as a Java applet may, in alternative embodiments, be coded in programming languages other than Java and may in some cases fall outside the strict definition of an "applet".

Other modifications will be apparent to those skilled in the art and, therefore, the invention is defined in the claims.

What is claimed is:

1. A method of establishing a voice call, comprising:
   at a first wireless communication device capable of voice communication in a first mode and a second mode, establishing a connection to a second wireless communication device capable of communication in said first mode and said second mode by:
   receiving an input of a first mode identity for said second wireless communication device;
   presenting a dialog box on a display of said first wireless communication device providing an option to complete said voice call as a first mode call or to complete said voice call as a second mode call;
   upon receiving a selection of said option to complete said voice call as a second mode call, attempting to obtain a second mode identity for said second wireless communication device;
   upon obtaining said second mode identity for said second wireless communication device, initiating said voice call as a second mode call to said second mode identity.

2. The method of claim 1 wherein said first mode identity is a telephone directory number.

3. The method of claim 2 wherein said second mode identity is a data network address.

4. The method of claim 3 wherein said data network address is an Internet Protocol (IP) address.

5. The method of claim 3 wherein said data network address is a Session Initiation Protocol Uniform Resource Identifier.

6. The method of claim 1 wherein said second mode call is a Voice over Internet Protocol (VoIP) call.

7. The method of claim 1 further comprising, upon receiving a selection of said option to complete said voice call as a second mode call, indicating on said display that said second mode call is being attempted.

8. The method of claim 1 wherein said attempting to obtain a second mode identity for said second wireless communication device comprises:
   transmitting a query to a database, where said query includes said first mode identity for use as a key;
   receiving a response to said query; and
   determining whether said response includes a second mode identity for said second wireless communication device.

9. The method of claim 1 wherein said attempting to obtain a second mode identity for said second wireless communication device comprises:
   receiving, via a presence service in which said second wireless communication device acts as a presentity, presence information regarding said second wireless communication device, said presence information including said second mode identity of said second wireless communication device.

10. The method of claim 9 wherein said receiving of said presence information is based on said first wireless communication device acting as a watcher within said presence service.

11. The method of claim 9 wherein said presence service is part of an instant messaging service.

12. The method of claim 1 wherein said initiating comprises sending a Session Initiation Protocol INVITE request.

13. A non-transitory machine readable medium storing software that, when executed by a processor of a first wireless communication device capable of voice communication in a first mode and a second mode, causes said device to establish a connection to a second wireless communication device capable of communication in said first mode and said second mode, by:
   receiving an input of a first mode identity for said second wireless communication device;
   presenting a dialog box on a display of said first wireless communication device providing an option to complete said voice call as a first mode call or to complete said voice call as a second mode call;
   upon receiving a selection of said option to complete said voice call as a second mode call, attempting to obtain a second mode identity for said second wireless communication device;
   upon obtaining said second mode identity for said second wireless communication device, initiating said voice call as a second mode call to said second mode identity.

* * * * *